United States Patent [19]

Wensel et al.

[11] Patent Number: 4,698,767

[45] Date of Patent: Oct. 6, 1987

[54] APPARATUS AND METHOD FOR CONTROLLING INFRARED DRYER FOR DISCREET ARTICLES

[75] Inventors: Neil D. Wensel, Cary; Gary E. Norris, Hoffman Estates; Craig G. Beierwaltes, Rolling Meadows, all of Ill.

[73] Assignee: Electro Sprayer Systems, Inc., Schiller Park, Ill.

[21] Appl. No.: 765,549

[22] Filed: Aug. 14, 1985

[51] Int. Cl.[4] .......................... G06F 15/46; H05B 1/02; G01V 9/04; G06M 7/06

[52] U.S. Cl. .................................... 364/471; 364/478; 219/388; 219/502; 355/14 SH; 250/495.1; 250/223 R; 377/3; 377/53; 271/6; 271/7; 271/268; 271/277; 34/41; 34/151

[58] Field of Search ............... 219/502, 388, 492, 358, 219/497; 250/561, 495.1, 223 R; 34/41, 151; 364/471, 477, 478; 271/255, 268, 277, 6, 7; 235/455; 371/8; 355/14 SH, 3 SH, 14 R; 377/53, 3

[56] References Cited

U.S. PATENT DOCUMENTS

| | | | |
|---|---|---|---|
| 3,679,518 | 7/1972 | Andler et al. | 156/371 |
| 4,032,817 | 6/1977 | Richmond | 315/149 |
| 4,049,947 | 9/1977 | Bestenreiner et al. | 219/216 |
| 4,166,246 | 8/1979 | Matt | 377/53 |
| 4,354,095 | 10/1982 | de Vries | 219/388 |
| 4,384,194 | 5/1983 | Jones | 371/8 |
| 4,384,202 | 5/1983 | Fasig | 250/223 R |
| 4,408,400 | 10/1983 | Colapinto | 219/388 X |
| 4,435,637 | 3/1984 | de Vries | 219/358 |
| 4,436,985 | 3/1984 | Weber | 219/343 X |
| 4,453,841 | 6/1984 | Bobick et al. | 355/14 SH |
| 4,494,656 | 1/1985 | Shay et al. | 377/53 |
| 4,541,063 | 9/1985 | Doljack | 364/478 |

*Primary Examiner*—Jerry Smith
*Assistant Examiner*—John R. Lastova

[57] ABSTRACT

An infrared dryer is provided for a printing press which uses a series of carriers, each comprising one or more gripper bars, on a conveyor to respectively carry printed sheets past the dryer. The sensor produces different binary signals in response to the presence or absence of material, viz, a gripper bar structure or carried sheets in the path, each carrier producing a predetermined number of transitions between the presence and absence signals, the only change between an empty carrier and one carrying a sheet being the duration of the presence and absence signals. A microprocessor is programmed to cyclically count from zero to the predetermined number of transitions, with each count cycle representing the passage of a carrier. The microprocessor also measures and compares the total durations of the presence and absence signals during each count cycle. If the presence signal duration exceeds the absence signal duration, then the heater is actuated to a preselected operating intensity. If the presence duration does not exceed the absence duration, then the heater is actuated to a low stand-by intensity. The heater is also actuated to the stand-by intensity if either the presence signal or the absence signal persists for more than a predetermined duration during a count cycle.

11 Claims, 9 Drawing Figures

APPARATUS AND METHOD FOR CONTROLLING INFRARED DRYER FOR DISCREET ARTICLES

BACKGROUND OF THE INVENTION

The present invention relates to the control of a device which operates upon articles moved past the device. In particular, the invention relates to the control of heating apparatus of the type used for drying articles, such as discrete sheet material. The invention has particular application to the infrared drying of printed sheets in a printing press.

Specifically, the invention relates to the control of dryers for printing presses comprising infrared heating units arranged to face the printed sheets as they are conveyed past the dryer. In one common control arrangement, the heating unit is turned on to a preselected intensity in response to the operation of the impression rolls of the press. In this arrangement, the heater simply stays on, as long as the impression rolls are operative. Therefore, in the case of a paper feed malfunction, for example, the heater would stay on despite the fact that no paper is being fed through the press, resulting in a waste of power for operating the heaters. Similarly, the dryer does not turn off in the event of a paper jam. This can be dangerous since, if the jam occurs in the vicinity of the heater the intense heat created thereby can easily start a fire.

It has, therefore, been recognized that it is desirable to tie the control of the dryer to the movement of the paper rather than to the operation of the impression rolls of the press. One such arrangement is disclosed in U.S. Pat. Nos. 4,354,095 and 4,435,637. The dryer control circuits in these patents utilize two types of controls. The intensity of the heaters is varied in response to either the speed of the paper conveyor or the temperature of the paper at the detecting zone. This temperature is also a function of the transport speed, since the slower the speed the longer a sheet remains in front of the heater and the higher the temperature to which it will be raised. The control circuits also utilize a capacitive discharge timing circuit to disconnect the heater if one or more sheets is missing from a series of conveyed sheets, indicating a misfeed, or if a sheet remains too long in front of the sensor, indicating a jam.

But these prior control circuits are sensitive to the gripper bars of the paper carriers, as well as to the paper sheets themselves. This makes it very difficult to properly set the RC time constant for detecting the absence of a sheet. This time constant must be greater than the time intervals for passage of the gap between the end of a sheet and the next carrier, and yet be less than the time interval for passage of the gap between adjacent carriers. Since both of these time intervals vary with the speed of the conveyor, a proper setting for the time constant is difficult to determine and maintain in use.

An attempt has been made to avoid this difficulty by sensing the free tail end of a gripped sheet, this tail end being distinguishable because it droops from the plane of the leading edge of the sheet. But the amount of droop also varies with the speed of the press conveyor.

SUMMARY OF THE INVENTION

It is a general object of the present invention to provide an improved control method which avoids the disadvantages of prior control methods while affording additional structure and operating advantages.

An important object of the invention is to provide a control method for controlling a device with respect to articles conveyed past the device, and which is responsive to the passage of the articles and is unresponsive to the passage of the conveyor structure.

In connection with the foregoing object, it is another object of the invention to provide a control method of the type set forth which is unaffected by variations in the rate of passage of the articles.

In connection with the foregoing objects, it is another object of the present invention to provide an apparatus for performing the method.

Yet another object of the invention is a provision of a control apparatus of the type set forth which is a relatively simple and economical construction.

In connection with the foregoing objects, it is still another object of the present invention to provide, in combination, a control apparatus of the type set forth and a dryer means controlled thereby.

These and other objects of the invention are attained by providing control apparatus for controlling a device in response to the presence or absence of articles relative to the device as the articles are moved respectively by a series of carriers along a path, the control apparatus comprising: detector means along the path responsive to the presence of an article or carrier structure for producing a first binary signal level and responsive to the absence of articles or carrier structure for producing a second binary signal level, each carrier producing a predetermined number of transitions between first and second signal levels of the detector means; and processor means, the processor means including transition counting means for cyclically counting from zero to the predetermined number of transitions between the first and second signal levels so that each count cycle represents the passage of a carrier, and means for comparing the total time durations of the first and second signal levels during each count cycle for producing a first control signal when the ratio of the first signal level duration to the second signal level duration exceeds a predetermined ratio and for otherwise producing a second control signal.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figures 1, 5, 5A, 5B:
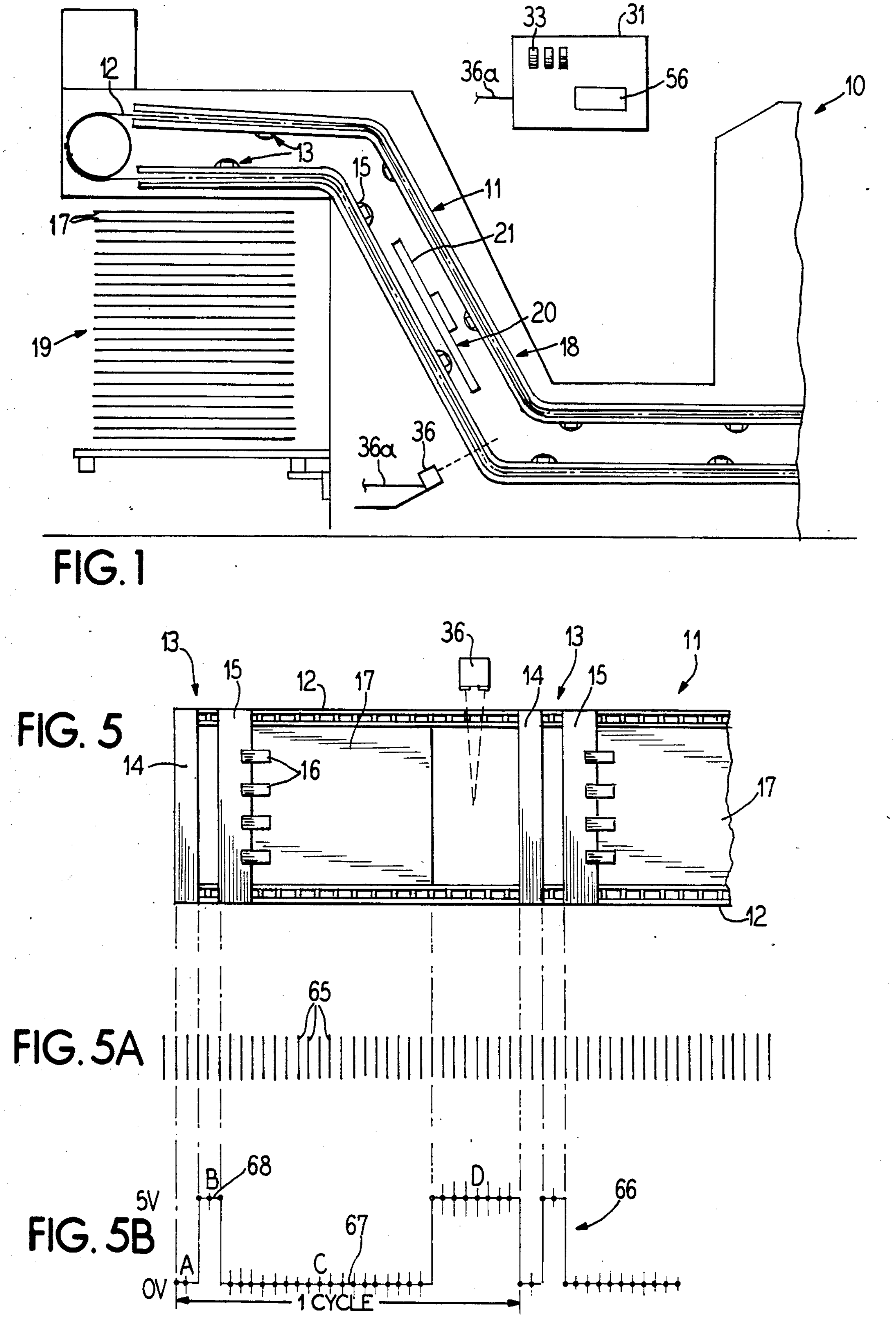
FIG. 1 is a diagrammatic perspective view of a portion of a printing press and infrared drying means therefor, incorporating control apparatus in accordance with and embodying the features of the present invention.
FIG. 5 is an enlarged, fragmentary and partially diagrammatic top plan view of a portion of the press conveyor of FIG. 1, illustrating the relationship to the sheet sensor.
FIG. 5A is a waveform diagram of the clock pulses applied to the sensor sample control circuit of FIG. 4.
FIG. 5B is a waveform diagram on the same time base as FIG. 5A, illustrating the response of the sheet sensing circuit of FIG. 3 to aligned portions of the press conveyor of FIG. 5.

Referring to FIG. 1, there is illustrated a portion of a printing press, generally designated by the numeral 10, with which the present invention may be used. Referring also to FIG. 5, the printing press 10 includes a conveyor 11 comprising a pair of endless chains 12 supporting therebetween a plurality of carriers 13 spaced apart longitudinally of the conveyor 11. Each carrier 13 comprises a pair of gripper bars 14 and 15 which span the chains 12, the gripper bar 15 having a plurality of grippers 16 adapted for gripping engagement with the leading edge of a paper sheet 17 which is imprinted by the printing press 10. The paper sheets 17 are fed from an input supply (not shown) through the impression rolls of the printing press 10 in a known manner. The printed sheets 17 are then respectively picked up by the carriers 13 and pulled by the conveyor 11 through a drying station 18 for drying the ink, the sheets 17 then being delivered to the top of a delivery pile 19, all in standard fashion.

Figure 2:
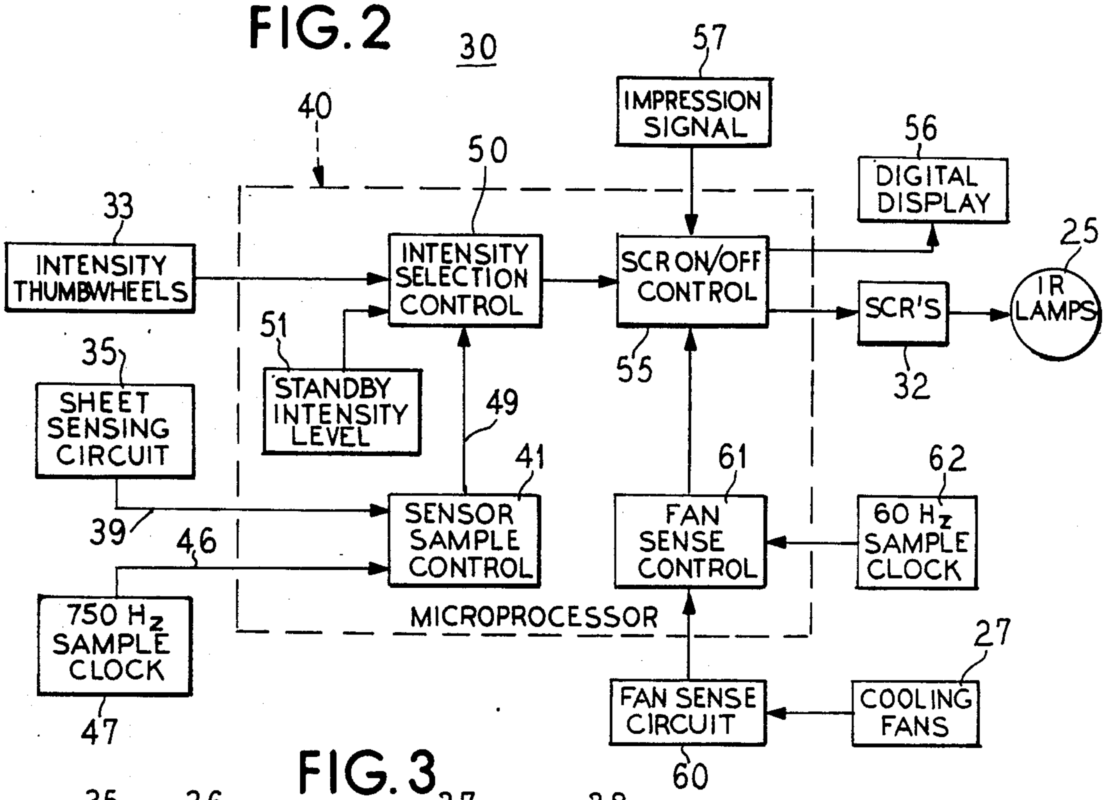
FIG. 2 is a functional block diagram of the control apparatus of the present invention.

Disposed at the drying station 18 is a dryer unit 20, which includes an infrared ("IR") heater panel 21 comprising a plurality of IR lamps 25, diagrammatically indicated in FIG. 2, and arranged to face the printed sheets 17 as they are carried through the drying station 18. There may also be provided a plurality of cooling fans 27, diagrammatically indicated in FIG. 2, arranged to dissipate the heat generated by the IR lamps 25 to avoid excessive heat buildup at the drying station 18.

Referring now also to FIG. 2, there is also provided a control circuit 30, constructed in accordance with and embodying the features of the present invention, and housed in a control box 31 (FIG. 1) located at a control station for the printing press 10. Housed in the control box 31 are a plurality of silicon controlled rectifiers ("SCR's") 32, diagrammatically indicated in FIG. 2, for controlling the intensity of the IR lamps 25. The SCR's 32 operate in a known manner to provide a phased control of the AC power supply to the IR lamps 25, the SCR's 32 being fired into conduction at a predetermined point during each half cycle of the AC supply waveform. The earlier in each half cycle that the SCR 32 conducts, the greater the power supplied to the IR lamps 25, and the greater their intensity. Preferably, 3-phase power is utilized, necessitating six SCR's 32. Selector switches 33 are provided on the control box 31 for manually selecting the intensity of the IR lamps 25. The selector switches 33 may be thumbwheel switches with a digital readout to select a decimal percentage of the maximum lamp intensity.

Figure 3:
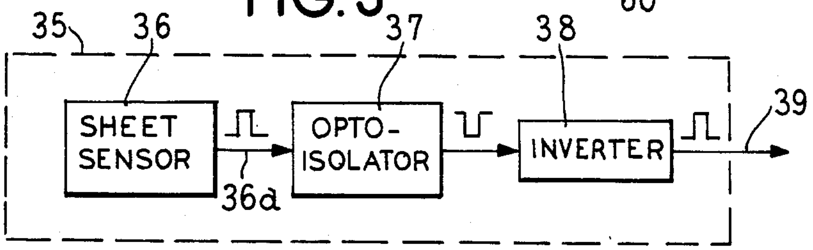
FIG. 3 is a block diagram of the sheeet sensing circuit fo FIG. 2.

The control circuit 30 includes a sheet sensing circuit 35, details of which are illustrated in FIG. 3. The sheet sensing circuit 35 includes a sheet sensor 36, which may be a photoelectric sensor and is preferably disposed along the conveyor 11 just upstream of the dryer unit 20, as illustrated in FIG. 1. The sheet sensor 36 may direct a beam of light to a point midway between conveyor chains 12, as indicated in FIG. 5. The output of the sheet sensor 36 is a binary digital signal, as indicated in FIG. 3, and it is applied over a conductor 36a to an opto-isolator 37 located in the control box 31. The opto-isolator 37 inverts the signal from the sheet sensor 36 and, therefore, the output of the opto-isolator 37 is again inverted by an inverter 38, the output of which is applied over a conductor 39 to an input terminal of a microprocessor 40, which may be a model 8751 manufactured by Intel Corporation.

Figure 4:
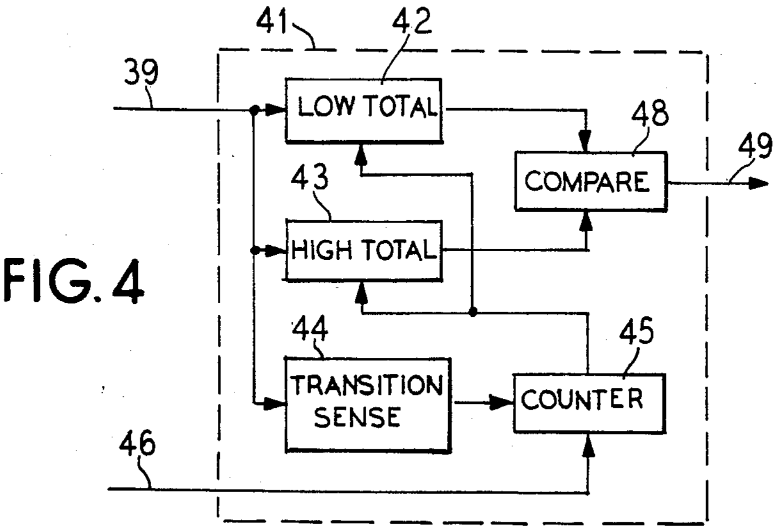
FIG. 4 is a further detailed functional block diagram of the sensor sample control block of FIG. 2.

More particularly, the output of the inverter 38 is connected to an input of a sensor sample control circuit 41, details of which are illustrated in FIG. 4. The conductor 39 is connected to the inputs of a low total circuit 42, a high total circuit 43 and a transition sense circuit 44, which will be explained in greater detail below. The output of the transition sense circuit 44 is applied to the input of a counter 45, which also receives on a conductor 46 clock pulses from a 750 Hz sample clock 47 (see FIG. 2). The output of the counter 45 is applied to the low total and high total circuits 42 and 43 for gating their outputs to a compare circuit 48. The output of the compare circuit 48 is applied on line 49 to a control input of an intensity selection control circuit 50, which selects between a standby intensity level, determined by a signal from a standby intensity level circuit 51, and an operating intensity level, determined by the thumb wheel selector switches 33.

The output of the intensity selection control circuit 50 is applied to an SCR ON/OFF control circuit 55, which produces output gating signals to the SCR's 32. The SCR ON/OFF control circuit 55 also produces an output to a digital display 56 in the control box 31 for giving a visual indication of the current intensity level of the IR lamps 25. There may also be provided to the SCR ON/OFF control circuit 55 a signal from an impression signal source 57 on the printing press 10, which indicates that the impression rolls are operable. If desired, this signal may be used as an override to actuate the SCR ON/OFF control circuit 55 to switch off the SCR's 32 when there is no impression from the printing press 10.

The control circuit 30 also includes fan sense circuits 60 which are connected to the cooling fans 27 for sensing whether or not they are operable. The fan sense circuits 60 produce digital output signals which are multiplexed and sampled by a fan sense control circuit 61 in the microprocessor 40, under timing control of clock pulses from a 60 Hz sample clock 62. The output of the fan sense control circuit 61 is applied to an input of the SCR ON/OFF control circuit 55 for actuating it to switch off the SCR's 32 in the event that any of the cooling fans 27 are inoperative.

Referring now also to FIGS. 5, 5A and 5B, the operation of the sheet sensing circuit 35 and the sensor sample control circuit 41 will be explained. The sheet sensor 36 produces a low level binary signal when its beam intercepts an object being moved along the conveyor paths, and a high level binary signal when its beam does not intercept a conveyed object. Because the gripper bars 14 and 15 span the conveyor chains 12, they will intercept the beam of the sheet sensor 36 to produce a low level binary signal, just as will a conveyed paper sheet 17. It is a fundamental aspect of the present invention that it essentially disregards the detections of the gripper bars 14 and 15, so that the dryer unit 20 will be responsive only to the presence of a paper sheet 17.

The output of the sheet sensing circuit 35 is sampled by the 750 Hz clock pulses 47. The clock pulses are designated 65 in FIG. 5A, and the sampled output waveform of the sheet sensing circuit 35 is designated 66 in FIG. 5B. It can be seen that the output waveform 66 has low level portions A and C made up of low level samples 67 and high level portions B and D made up of high level samples 68. The low level output portions A and C will be produced, respectively, by the gripper bar 14 and the combination of the gripper bar 15 and the gripped sheet 17, while the high level output portions B and D will be produced, respectively, by the gap between the gripper bars 14 and 15 and the gap between adjacent carriers 13. The gripped sheet 17 abuts the gripper bar 15 so there is no gap therebetween. Typically, a sheet 17 will be shorter than the gap between adjacent carriers 13, so that the output waveform 66 will have a high level sample 68 at the gap between the tail end of the sheet 17 and the gripper bar 14 of the next carrier 13. Thus, it can be seen that each carrier 13, whether or not it is carrying a sheet 17, will produce an output waveform which has two low level portions A and C and two high level portions B and D.

The only difference between the output waveforms produced by an empty carrier 13 and a carrier 13 which carries a sheet 17 is in the relative lengths of the second high and low level portions C and D of the waveform 66. More particularly, it has been determined that when a sheet 17 is present the total duration of the low level portions A and C of the output waveform 66 will be greater than the total duration of the high level portions B and D thereof for a given carrier 13. On the other hand, if the sheet 17 is absent, the total duration of the high level portions B and D will be greater than the total duration of the low level portions A and C of the output waveform 66 produced by the carrier 13. Thus, if the ratio of the total duration of the low level portions A and C to the total duration of the high level portions B and D is greater than one, this indicates the presence of a sheet 17, and if the ratio is not greater than one, it indicates the absence of a sheet 17 in the carrier 13.

To utilize this information, the low total circuit 42 computes the total duration of the low level portions A and C and the high total circuit 43 computes the total duration of the high level portions B and D. The transition sense circuit 44 senses the transitions between the low level and high level portions of the output waveform 66. These transitions are cyclically counted in the counter circuit 45 under the control of the 750 Hz sample clock pulses 65 on the conductor 46, the counter 45 counting from 0 to 4 during each count cycle since there are four such transitions produced by each carrier 13. Thus, each time the counter 45 reaches a count of four, this signifies the passage of a carrier 13 and the counter 45 produces a gating output signal to the low total and high total circuits 42 and 43 for releasing their outputs to the compare circuit 48.

If the low total is greater than the high total the compare circuit 48 produces a first output signal on the line 49 which causes the intensity selection control circuit 50 to select as the current intensity the operating intensity value selected by the selector switches 33 for operating the IR lamps 25 to the desired operating intensity. If, on the other hand, the high total is greater than the low total, the compare circuit 48 produces a second output signal on the line 49 which causes the intensity select control circuit 50 to select the standby intensity level as the current intensity. In a preferred embodiment of the invention, this standby intensity level is greater than zero, and is preferably in a range of from about 5% to about 10% of the maximum intensity level of the lamps 25. Thus, if a sheet 17 is present, the IR lamps 25 are turned on to a preselected operating intensity, and if a sheet 17 is absent, the IR lamps 25 are turned down to the standby level, which is a level low enough to avoid any significant heat buildup in the drying station 18, thereby precluding the chance of a fire in the event that flammable material may become jammed at the drying station 18.

Thus, it can be seen that the present invention provides a unique control arrangement which accurately distinguishes between paper sheets 17 to be dried and other objects in the conveyor path, such as the structure of the carriers 13. Thus, the IR lamps 25 are actuated to their operating or standby conditions solely in response to the presence or absence of a paper sheet 17 to be dried.

While in the preferred embodiment the standby intensity level for the IR lamp 25 is greater than zero, it will be appreciated that it could also be zero so that the lamps are completely turned off in the absence of a sheet 17.

Figure 6:
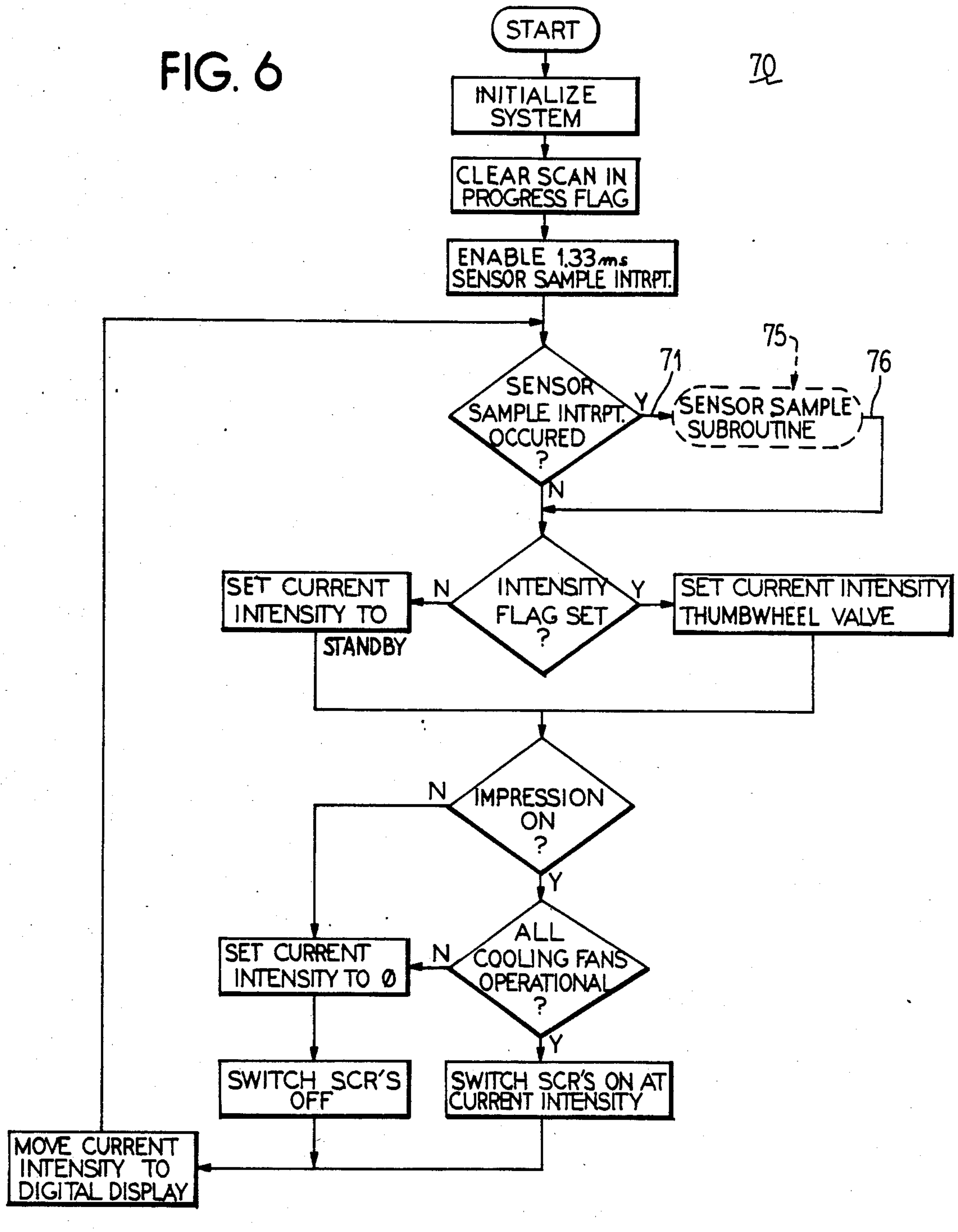
FIG. 6 is a flow chart of the main processing loop of the program for the microprocessor of FIG. 2.
Figure 7:
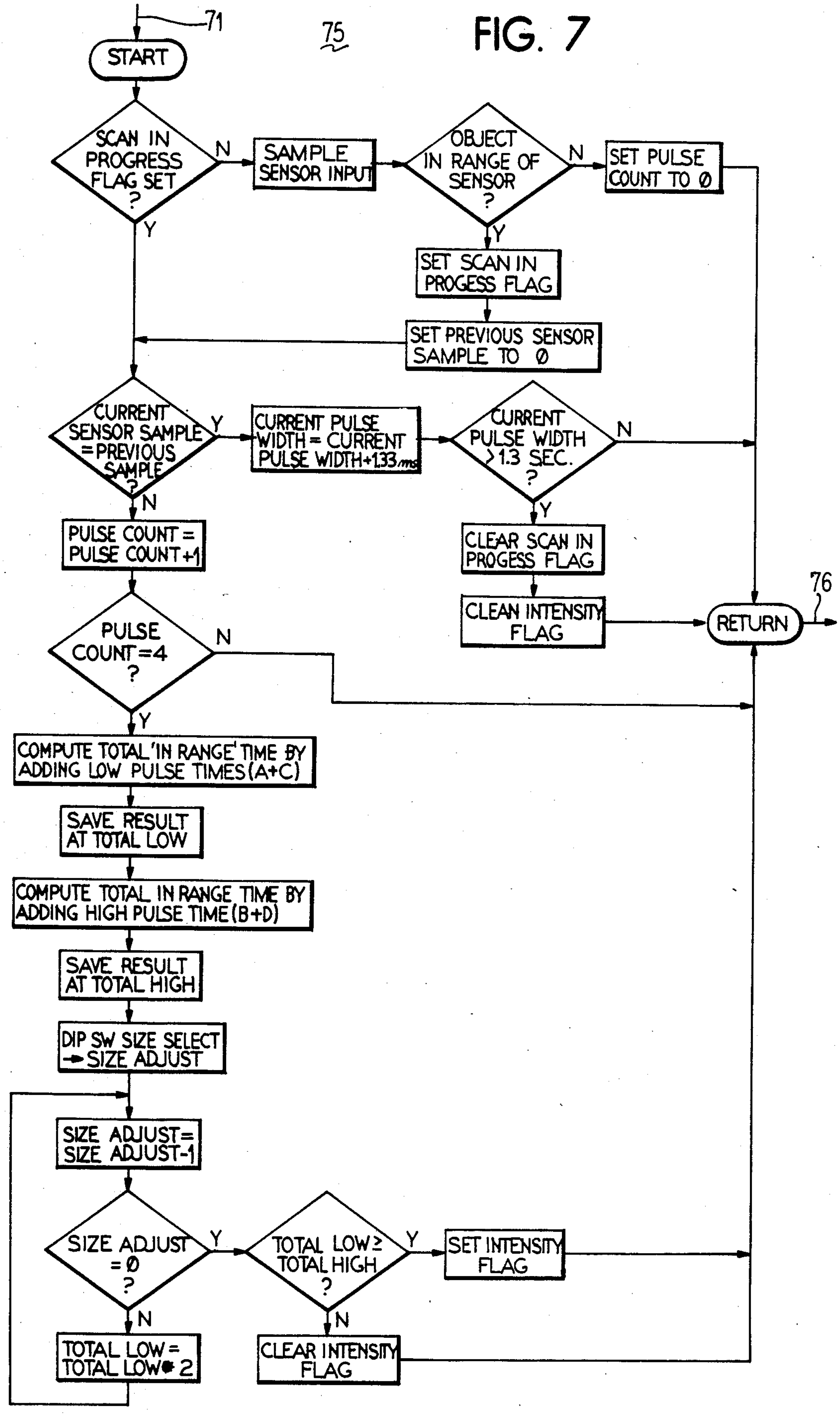
FIG. 7 is a flow chart of the sensor sample subroutine portion of the program of FIG. 6.

Referring now to FIGS. 6 and 7, the operation of the program for the microprocessor 40 will be described. The program has a main control loop 70, illustrated in FIG. 6. At startup the system is initialized and a "scan in progress" flag is cleared. Next, the 1.33 ms sensor sample interrupt is enabled to sense the 750 Hz sample clock pulses from the clock 47. The program then checks to see if a sensor sample interrupt, i.e., a 750 Hz clock pulse, has occurred. If it has, the program branches at line 71 to the sensor sample subroutine 75, illustrated in FIG. 7, which will be explained more fully below. If a sensor sample interrupt has not occurred, the program checks to see if the "intensity" flag is set. If it is, it sets the current intensity to the operating intensity selected by the thumbwheel switches 33, and if it is not, it sets the current intensity to the predetermined standby intensity.

If the impression signal option is utilized, the program next checks to see if the printing press impression is on. If it is not, the current intensity level is set to zero, for switching off the SCR's and the IR lamps. If the press impression is on, the program next checks to see if all the cooling fans are operational. If they are not, the lamp intensity is set to zero and the SCR's are switched off for the actuating lamps. If the fans are operational, the SCR's are switched on to the current intensity level. The current intensity level is then displayed on the digital display 56. This current intensity level may be the standby level or the operating level as selected by the switches 33 or zero.

Referring to FIG. 7, at the start of the sensor sample subroutine 75, the program first checks to see if the "scan in progress" flag is set. It is not, since it was just cleared when the main program loop was entered. Therefore, the program samples the input from the sheet sensing circuit 35 and checks to see if there is an object in range of the sensor 36, i.e., whether the sensor 36 is producing a low level output signal. If it is not, the pulse count in the counter circuit 45 is set to zero and the program returns on line 76 to the main program loop. If an object is in range, the "scan in progress" flag is set and the "previous sensor sample" value is set to logic zero, i.e., a low level, to mark the beginning of a scan.

The program next checks to see if the current sensor sample is equal to the previous sensor sample, i.e., whether they are both at the same logic level. Had the "scan in progress" flag been set when the sensor sample subroutine 75 was entered, the program would have proceeded immediately to this decision. If the current sensor sample is the same logic level as the previous sample, then the current pulse width is incremented by 1.33 ms, i.e., the period of the 750 Hz sample clock pulses. Next, the program checks to see if the current pulse width is greater than 1.3 seconds. In other words, the program is asking whether or not the sheet sensor 36 has detected either the presence or the absence of an object continuously for more than 1.3 seconds. If it has not, the program returns to the main program loop. If the current pulse width is greater than 1.3 seconds, this indicates that either a carrier 13 has gone by with no sheets 17, perhaps as a result of a misfeed, or either the conveyor 11 has slowed or a jam has occurred creating the danger of a fire. In either case, the "scan in progress" and "intensity" flags are cleared and the program returns to the main program loop, which sets the current intensity to the standby level.

If the current sensor sample was not at the same logic level as the previous sample, this indicates there has been an intervening transition between high and low levels, so the counter circuit 45 is incremented by one. The program next checks to see if the pulse count is equal to four. If it is not, the program returns to the main program loop. If the pulse count is equal to four, this indicates the end of a count cycle, so the program computes the total "in range" or logic low level duration of the output waveform 66 from the sheet sensing circuit 35 by adding the low level portions A and C and saves this result at total low. It then computes the total "out of range" or logic high level duration of the waveform 66 by adding the durations of the high level portions B and D, saving this result at total high.

The control circuit 30 is provided with DIP switches (not shown) for selecting the particular size sheet 17 being used by the printing press 10. The program enters a size adjust value dependent on the setting of the size select switches. For purposes of illustration, the size adjust value for the maximum size sheet used will be 1. The program then decrements the size adjust value by one and checks to see if the size adjust value is equal to zero. If it is, the program then checks to see if the total low value is greater than the total high value. If it is, indicating the presence of a sheet 17, the "intensity" flag is set and the program returns to the main loop which will set the current intensity value to that selected by the selector thumbwheel switches 33. If the total low value is not greater than the total high value, this indicates the absence of a sheet 17, and the "intensity" flag is cleared, the program then returning to the main program loop which sets the current intensity to the standby level.

If some sheet other than the maximum size sheet is used, a different size adjust value will be entered and the program will decrement the size adjust value by an amount which is also determined by the size selector switch setting. If the size adjust is not equal to zero, the program will multiply the total low value by two and the size adjust value is again decremented and this process continues until the size adjust value equal zero, at which point the total low value will have been increased by the amount necessary to bring it to a value which is greater than the total high value when a sheet 17 is present.

Thus, it can be seen that the main program loop continuously recycles, and every time a 750 Hz clock pulse occurs, it branches to the sensor sample subroutine 75 to check to see if the current sample level has persisted for too long and also checks to see if there have been any transitions between low and high sample levels, and counts such transitions. It will be appreciated that the cycle rate of the main program loop is much greater than 750 Hz.

While the invention has been described in connection with carriers 13 which have two gripper bars 14 and 15, it will be appreciated that the present invention could also be used with printing presses of the type which utilize a single gripper bar in each carrier 13. In this case, there would be only two transitions between high and low sensor output levels for each carrier passage. Therefore, the program would be adjusted so that during each count cycle the counter circuit 45 would count only from zero to 2. Alternatively, the program could remain unchanged, and the control circuit 30 could operate only on every other carrier passage instead of on each successive carrier passage.

From the foregoing, it can be seen that there has been provided an improved drying apparatus and control circuit therefore which is of relatively simple and economical construction, unambiguously distinguishes between article carriers and the articles carried thereby for actuation only in response to the carried articles, and which provides adjustment means for accommodating different size articles, the control circuit providing accurate control independently of the speed of passage of the articles and independently of article carrier structure.

We claim:

1. Control apparatus for controlling a device in response to the presence or absence of articles in a predetermined space, as the articles are moved by a series of conveyors along a path through said space, said control apparatus comprising: detector means disposed adjacent said path and responsive to the presence of an article or carrier structure for producing a first binary signal level and responsive to the absence of articles or carrier structure for producing a second binary signal level, said detector producing a predetermined number of transitions from each carrier while producing said first and second signal levels, processor means connected to said detector means and responsive thereto, said processor means including transition counting means for cyclically counting from zero to said predetermined number of transitions while said first and second signal levels are produced so that said predetermined number of transitions represents the passage of a carrier, and said processor means including means for comparing the total time durations of said first and second signal levels during said predetermined number of transitions for producing a first control signal when the ratio of said first signal level duration to said second signal level duration exceeds a predetermined ratio and for otherwise producing a second control signal.

2. The control apparatus of claim 1, including means for selecting said predetermined ratio in accordance with the size of said articles.

3. The control apparatus of claim 2, wherein said predetermined number of transitions is four.

4. The control apparatus of claim 1, wherein said predetermined ratio is less than one.

5. The control apparatus of claim 1, and further including means for causing said second control signal to be produced if either said total time duration of said first signal level or said total time duration of said second signal level during a count cycle exceeds a predetermined time period.

6. The control apparatus of claim 5, wherein said predetermined time period is approximately 1.3 seconds.

7. The control apparatus of claim 1, wherein said processor means comprises a microprocessor under program control.

8. A method for controlling a device in response to the presence or absence of articles in a predetermined space as the articles are moved by a series of carriers along a path through said space, said method comprising the steps of: detecting the presence or absence of an article or carrier structure at a predetermined location along said path, predetermining the number of transitions between the presence and absence detections for each carrier or for each carrier and article combination, cyclically counting from zero to said predetermined number of transitions so that each cycle count represents a carrier or a carrier and article combination, predetermining the ratio between the total time durations of said presence and absence indications for a carrier with no carried article, measuring the ratio between the total time duration of said presence and absence detections for each detected carrier or carrier and article combination, comparing each said measured ratio to said predetermined ratio, and producing a first control signal when said measured ratio exceeds said predetermined ratio and producing a second control signal when said measured ratio does not exceed said predetermined ratio.

9. The method of claim 8, and further including the step of adjusting said predetermined ratio in accordance with variation in the size of the articles.

10. The method of claim 8, and further including the steps of predetermining a standby power level for the device, selecting an operating power level for the device, and actuating the device to said operating power level in response to said first control signal and actuating said device to said standby power level in response to said second control signal.

11. A method of claim 10, including the step of actuating the device to said standby power level when either said total time duration of said presence indication or said total time duration of said absence indication during the counting cycle exceeds the predetermined duration.

* * * * *